United States Patent
Counter et al.

(10) Patent No.: US 6,843,727 B2
(45) Date of Patent: Jan. 18, 2005

(54) FLEXIBLE WRAP-TYPE SHAFT COUPLING

(75) Inventors: Louis F. Counter, West Allis, WI (US); Terence Voss, Penwaukee, WI (US); William R. Hubiak, West Allis, WI (US)

(73) Assignee: Rexnord Industries, Inc., Milwaukee, WI (US)

(*) Notice: Subject to any disclaimer, the term of this patent is extended or adjusted under 35 U.S.C. 154(b) by 0 days.

(21) Appl. No.: 10/371,607

(22) Filed: Feb. 21, 2003

(65) Prior Publication Data

US 2004/0166945 A1 Aug. 26, 2004

(51) Int. Cl.⁷ ............................................. F16D 3/54

(52) U.S. Cl. .......................... 464/49; 464/903; 464/88

(58) Field of Search .......................... 464/87, 88, 153, 464/154, 903, 49; 403/23, 203, 221, 223, 298

(56) References Cited

U.S. PATENT DOCUMENTS

| | | | |
|---|---|---|---|
| 1,328,366 A | 1/1920 | Brown | |
| 1,952,232 A | 3/1934 | Axien | |
| 2,213,277 A | 9/1940 | Guy | 64/14 |
| 2,301,659 A | 11/1942 | Ricefield | 64/14 |
| 2,337,287 A | 12/1943 | Williams | 64/14 |
| 2,502,790 A | 4/1950 | Jencick | 64/14 |
| 2,629,991 A | 3/1953 | Guy | 64/14 |
| 2,655,798 A | 10/1953 | Neher | 64/14 |
| 2,740,271 A | 4/1956 | Beler | 64/11 |
| 2,859,599 A | 11/1958 | Case | 64/11 |
| 2,867,102 A | 1/1959 | Williams | 64/11 |
| 2,867,103 A | 1/1959 | Williams | 64/11 |
| 2,924,082 A | 2/1960 | Reich | 64/13 |
| 3,313,124 A | 4/1967 | Filepp | 64/9 |
| 3,362,191 A | 1/1968 | Louette | 64/11 |
| 3,363,729 A | 1/1968 | Patel | 64/14 |
| 3,410,112 A | 11/1968 | Gawreliuk | 64/14 |
| 3,729,953 A | 5/1973 | Wanzer | 64/9 |
| 3,834,182 A | 9/1974 | Trask et al. | 64/9 |

(List continued on next page.)

FOREIGN PATENT DOCUMENTS

| | | | |
|---|---|---|---|
| DE | 1 046 417 | 12/1958 | |
| DE | 974 473 | 1/1961 | |
| DE | 2 042 260 | 3/1972 | F16D/3/54 |
| FR | 839.967 | 4/1939 | |
| FR | 2 678 033 | 12/1992 | F16D/3/58 |
| GB | 459909 | 12/1935 | |

OTHER PUBLICATIONS

ATRA–FLEX Means Savings in Manpower and Downtime, Easy Installation, Economy and Long, Trouble–Free Sevice, Atra–Flex, No Date.
Elastomeric Couplings; Hi Misalignment Capacity Overload Protection, Dana Corporation, No Date.

*Primary Examiner*—David Bagnell
*Assistant Examiner*—K. Thompson
(74) *Attorney, Agent, or Firm*—Quarles & Brady LLP

(57) ABSTRACT

A flexible coupling assembly adapted for mounting on the ends of a shaft in coaxial alignment. The coupling includes a pair of annular hubs. A plurality of radially outwardly opening receptacles are spaced around the circumferential edge of each hub. A molded flexible belt is wrapped around the circumferential edge of both hubs, and has a plurality of spaced resilient teeth extending from one side of the belt. Each tooth is received in a pair of aligned receptacles formed in the hubs. The belt is molded with a length greater than the circumference of the circumferential edge, and the belt is cut to a length such that there is no more than one tooth per pair of receptacles. An annular retainer is slipped over the belt to retain the teeth in the receptacles. The retainer is held over the belt by at least one deformable pin extending from another side of the belt, and the pin is received in a circumferential groove formed on an inner surface of the annular retainer to retain the retainer over the belt.

16 Claims, 2 Drawing Sheets

U.S. PATENT DOCUMENTS

| | | | | |
|---|---|---|---|---|
| 3,874,194 A | * | 4/1975 | Filepp et al. | 464/154 |
| 4,044,572 A | | 8/1977 | Wellauer et al. | 64/15 |
| 4,072,028 A | | 2/1978 | Connell | 64/24 |
| 4,176,815 A | | 12/1979 | Davidson et al. | 248/589 |
| 4,357,137 A | | 11/1982 | Brown | 464/75 |
| 4,373,925 A | | 2/1983 | Fickelscher | 464/158 |
| 4,413,980 A | | 11/1983 | Walloch | 464/82 |
| 4,662,859 A | | 5/1987 | Sakai et al. | 464/88 |
| 4,881,921 A | | 11/1989 | Pokrandt et al. | 464/54 |
| 4,925,431 A | | 5/1990 | Pokrandt et al. | 464/54 |
| 4,969,371 A | | 11/1990 | Allen | 74/462 |
| 5,139,460 A | | 8/1992 | Hoyt, III et al. | 464/88 |
| 5,295,911 A | | 3/1994 | Hoyt, III et al. | 464/88 |
| 5,595,541 A | * | 1/1997 | Ducugnon | 464/154 |
| 5,657,525 A | | 8/1997 | Hoyt, III et al. | 29/407 |
| 5,738,585 A | | 4/1998 | Hoyt, III et al. | 464/88 |
| 5,908,355 A | | 6/1999 | Hoyt, III et al. | 464/88 |
| 6,019,684 A | | 2/2000 | Hoyt, III et al. | 464/88 |
| 6,024,644 A | | 2/2000 | Hoyt, III et al. | 464/88 |
| 6,142,878 A | | 11/2000 | Barin | 464/88 |

* cited by examiner

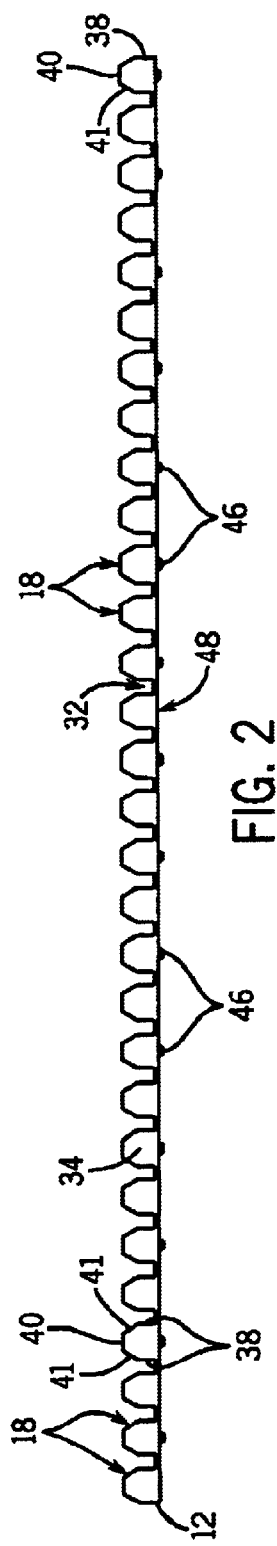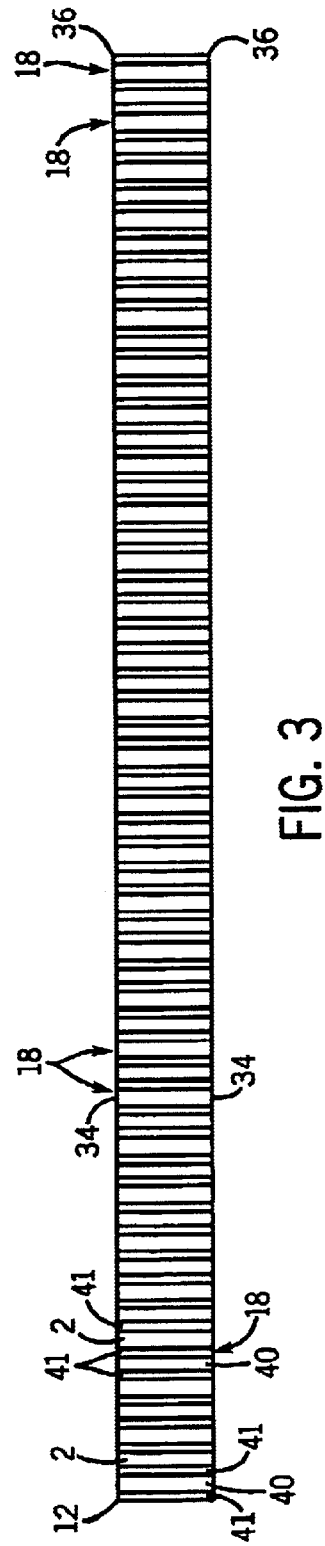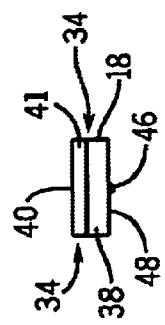

FLEXIBLE WRAP-TYPE SHAFT COUPLING

CROSS-REFERENCE TO RELATED APPLICATIONS

Not Applicable

STATEMENT REGARDING FEDERALLY SPONSORED RESEARCH

Not Applicable

FIELD OF INVENTION

This invention relates to shaft couplings, and particularly to a wrap-type flexible coupling belt which can fit a plurality of shaft coupling sizes.

BACKGROUND OF THE INVENTION

Flexible couplings are used to transmit a rotational force from a rotatably driven shaft to a coaxially aligned shaft. One particular coupling includes a resilient coupling member molded in an annular shape to fit around two substantially identical hubs. Each hub is mounted to one of the shaft ends, and has circumferentially spaced receptacles. The coupling member has projections which are received in the receptacles, and are interposed between the hubs to transfer the rotational force from one hub to the other. An endless metal retainer ring is slipped over the belt to secure the teeth in the receptacles. The coupling member is produced in a plurality of sizes (i.e. different diameters) to fit different sized hubs.

These couplings, advantageously accommodate minor shaft misalignments between the shafts which can result from manufacturing or assembly errors. Because of the advantages inherent in the flexible coupling they are used throughout the world, and are available in a wide range of sizes. When a coupling does fail, it is often a result of the resilient coupling member failing, and therefore, as a part of routine maintenance, these coupling members are replaced on a regular basis. If a facility has a number of the couplings of varying sizes, a coupling member for each coupling size must be stocked.

In addition, the coupling retainer ring has a tendency to "walk off" the coupling member if the shafts are grossly misaligned. As disclosed in U.S. Pat. No. 5,738,585, one method for retaining the ring on the coupling member is to form a radially inwardly extending rigid pin on an inner surface of the ring which engages an axial slot formed on the radially outwardly facing surface of the coupling member. Various methods are known to hold the pin over the coupling member, such that the ring does not walk off the coupling. Manufacturing the ring with the inwardly extending rigid pin is expensive, and the coupling member must have an outwardly facing surface which is sufficiently rigid to hold the pin in place. Moreover, if the rigid pin breaks off of the ring, an alternative means of retaining the ring over the coupling member is required, or a new ring must be provided.

BRIEF SUMMARY OF INVENTION

The present invention provides a flexible coupling assembly adapted for mounting on the ends of a shaft in coaxial alignment. The coupling includes a pair of annular hubs. Each hub has an outer end, a central bore open to the outer end and adapted for receiving an end of a shaft, an inner end facing in an opposite direction of the outer end and facing the inner end of the other hub. The inner end has a circumferential edge including a plurality of radially outwardly opening receptacles spaced around the circumferential edge. Each receptacle is open to the inner end, and substantially aligned with a receptacle formed in the other hub. A molded flexible belt is wrapped around the circumferential edge of both hubs, and has a plurality of spaced resilient teeth extending from one side of the belt. Each tooth is received in a pair of the aligned receptacles. The belt is molded with a length greater than the circumference of the circumferential edge, and the belt is cut to a length such that there is no more than one tooth per pair of receptacles. An annular retainer is slipped over the belt to retain the teeth in the receptacles.

A general objective of the present invention is to provide a resilient coupling member which can be modified to fit more than one size coupling. This objective is accomplished by providing a molded belt having a length greater than the circumference of the circumferential edge, and which can be cut to a length such that there is no more than one tooth per pair of receptacles.

In another aspect of the present invention at least one pin extends from another side of the belt, and the pin is received in a circumferential groove formed on an inner surface of the annular retainer to retain the retainer over the belt.

Another objective of the present invention is to provide a coupling having a retaining ring which does not require an inwardly extending rigid pin or an axial groove. This objective is accomplished by forming a pin on a side of the belt which is received in the circumferential groove.

This and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 2 is a plan view of the belt of FIG. 1;

FIG. 3 is an edge view of the belt of FIG. 1; and

FIG. 4 is an end view of the belt of FIG. 1.

DETAILED DESCRIPTION OF THE INVENTION

Figure 1:
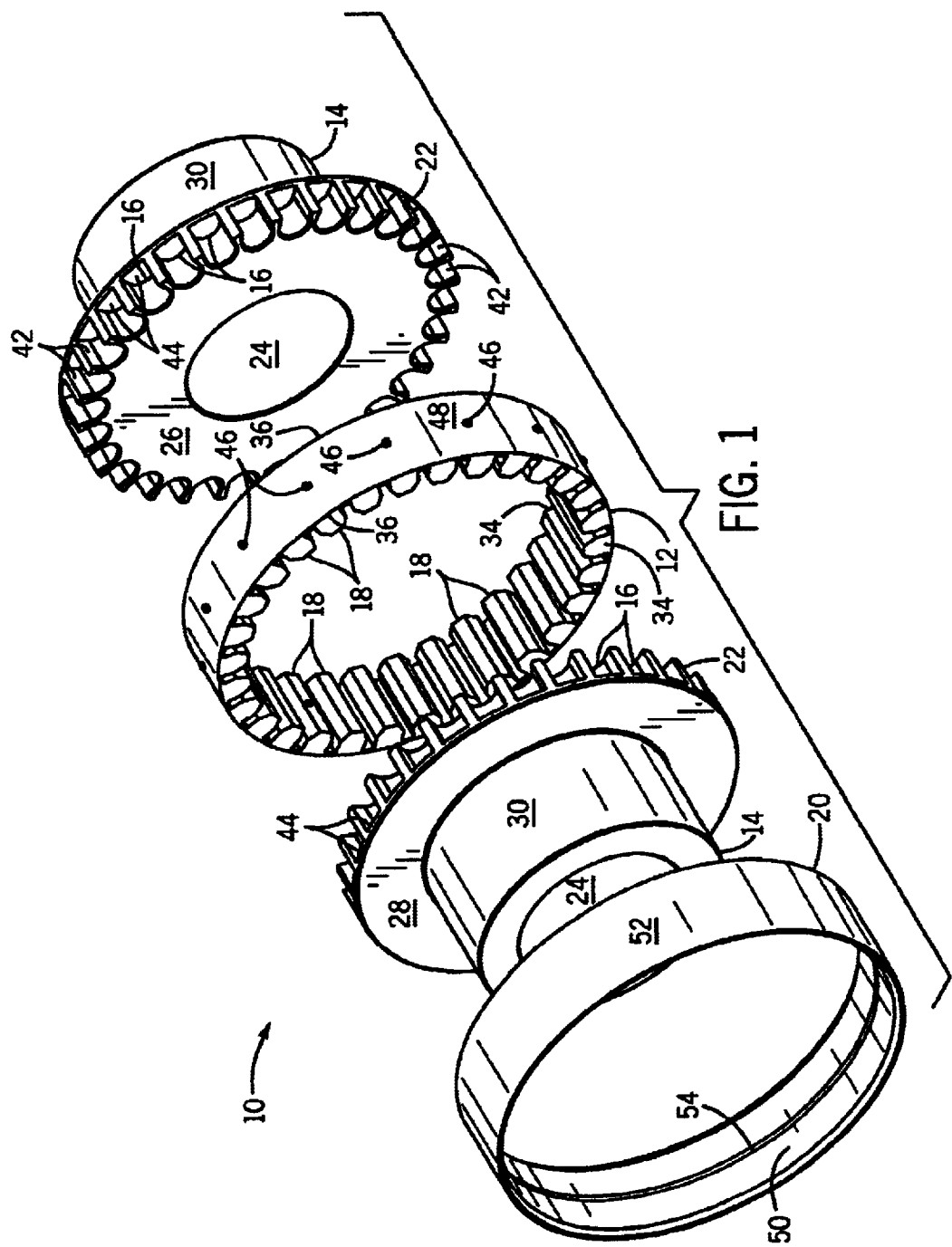
FIG. 1 is an exploded perspective view of a wrap-type flexible coupling incorporating the present invention.

As shown in FIG. 1, a coupling 10 for transferring rotational force from one shaft (not shown) to a coaxially aligned shaft (not shown) includes a flexible belt 12 wrapped around two substantially identical hubs 14. Each hub 14 is mounted to one of the shaft ends, and has circumferentially spaced receptacles 16. Teeth 18 joined to one side of the belt 12 are received in the receptacles 16, and interposed between the hubs 14 to transfer the rotational force from one hub 14 to the other. A retainer 20 is slipped over the belt 12 to secure the teeth 18 in the receptacles 16.

Each annular hub 14 has a circumferential edge 22, a central opening 24 for receiving a shaft end, a mating end 26, and a mounting end 28. The central opening 24 is open to the mounting end 28, and receives the shaft end. The shaft end is secured in the central opening 24, and thus to the hub 14, using methods known in the art, such as screws, bolts, pins, and the like. Preferably, the mounting end 28 is stepped to provide a coaxial annular portion 30 having an outer diameter which is less than the diameter of the circumferential edge 22 of the hub 14 to reduce the material required to form the hub 14. The central opening 24 extends through the annular portion 30, and the shaft is inserted into the central opening 24 extending therethrough.

The radially outwardly opening receptacles 16 are radially spaced around the circumferential edge 22. Each receptacle 16 is open to the mating end 26, and has an opposing closed end 44. The receptacles 16 can be any shape, and are sized to receive the teeth 18 joined to the belt 12. Although thirty receptacles 16 are shown in each hub 14, any number of receptacles 16 can be used without departing from the scope of the present invention.

The annular hubs 14 are mounted to opposing ends of the coaxial shafts, and the mating end 26 of one hub 14 faces the mating end 24 of the opposing hub 14. Each receptacle 16 of one hub 14 is substantially aligned with a receptacle 16 of the other hub 14, such that a pair of aligned receptacles 14 receive one of the teeth 18 joined to the belt 12. Preferably, a gap is formed between the hubs 14 to allow for some misalignment of the shafts, and the teeth 18 bridge the gap when received in the receptacles 16.

Referring to FIGS. 2-4, the belt 12 is molded as a flat or arced article, and a plurality of teeth 18 are joined to one side 32 of the flexible belt 12. An arced article is an article molded on a circular mold, and provides a belt which can be flattened for shipping or stocking. Preferably, the teeth 18 are molded as an integral part of the belt 12, and the molded article is formed from urethane. Although urethane is preferred, any elastomeric material which can provide a belt 12 having sufficient flexibility to wrap around a coupling hub 14 can be used, such as ethylene-propylene-diene monomer polymer (EPDM), rubber (natural, styrene butadiene (SBR), and the like), isoprene, neoprene, and the like, without departing from the scope of the present invention. Although a belt 12 having thirty teeth 18 for insertion into thirty receptacles 18 is shown, more or fewer teeth than the number of receptacles can be provided without departing from the scope of the invention. The actual number of teeth required is dependent upon the size of the teeth and the force being transmitted by the coupling.

The belt 12 maintains the teeth 18 in a spaced relation, and preferably, is formed having a continuous belt length greater than the circumferential edge 22. The belt 12, however, can be formed from a plurality of discontinuous belt sections which have a cumulative belt length equal to or greater than the length of the circumferential edge 22. Prior to assembling the coupling, the belt length is cut such that there is no more than one tooth 18 per pair of receptacles 16. The belt can be cut using any methods known in the art, such as by using a knife, without departing from the scope of the present invention. Advantageously, by providing a belt 12 which can be cut to fit the coupling hubs 14, a single belt size can be stocked to fit a wide range of couplings hubs 14.

Each tooth 18 has ends 34 joined by force transmitting sides 38 extending substantially perpendicular from the belt side 32. The sides 38 are joined to a flat top 40 at chamfered edges 41. The tooth sides 32 engage the sides 42 of the receptacle 16 (shown in FIG. 1) to transmit the radial force from one hub 14 to the other. Each tooth 18 has a transverse length which is less than or equal to the distance between the aligned receptacles closed ends 44, such that the tooth 18 fits in the receptacle 16 pair between the hubs 14. Although a tooth 18 having straight sides 38 and a flat top 40 is disclosed, other shapes, such as a truncated wedge shape, rounded top, and the like, can be used without departing from the scope of the present invention.

Preferably, resilient pins 46 are formed on an opposing side 48 of the belt 12, and extend radially outwardly when the belt 12 is wrapped around the hubs 14. The pins 46 engage the retainer 20 to hold the retainer 20 in place over the belt 12. Preferably, the pins 46 are formed as an integral part of the belt 12, and are spaced along the length of the belt 12 substantially equidistant from each belt longitudinal edge 36. Although resilient pins are preferred, the pins can be rigid without departing from the scope of the invention.

The annular retainer 20 is formed from a fiber reinforced polymeric material which slips over the belt 12 to retain the teeth 18 in the receptacles 16. Preferably, the retainer 20 is a glass fiber reinforced epoxy ring formed by using a filament winding process. However, the retainer 20 can be made using other materials such as polyester, vinyl ester and the like, and can be reinforced with Kevlar, carbon fibers, and the like. In addition the retainer 20 can be formed by using other methods and materials known in the art, such as injection molding a thermosetting or thermoplastic polymer matrix, forming rings from metal, and the like, without departing from the scope of the present invention.

The retainer 20 has a radially inwardly facing surface 50 and a radially outwardly facing surface 52. A circumferential groove 54 formed on the inwardly facing surface 50 receives the pins 46 to hold the retainer 20 over the belt 12. Preferably, the retainer 20 is an endless band having an inner diameter slightly larger than the diameter of the hub circumferential edge 22, such that the retainer 20 can slip over the hub edge 22 and engage the pins 46 in the groove 54. Although a continuous circumferential groove 54 is shown, the circumferential groove can be one or more circumferential slot segments which are formed on only a portion of the retainer inwardly facing surface 50.

In use, a user secures each hub 14 to an adjacent end of two coaxial shafts by slipping an end of one of the shafts into the center opening 24 of the hub 14, such that the mating end 26 of one hub 14 faces the mating end 26 of the other hub 14, and a gap is defined between the hub mating ends 26. The user then rotates one of the hubs 14 to align the receptacles 16 on the hub 14 with the receptacles 16 of the other hub 14, and provide aligned pairs of receptacles 16.

Prior to finally wrapping the belt 12 around the hubs 14, the user cuts the belt 12, such that there is no more than one tooth 18 per pair of receptacles 16. The cut belt 12 is then wrapped around the hubs 14, and each tooth 18 is slipped between the hubs 14 into a pair of aligned receptacles 16. Advantageously, the belt 12 can be cut from a continuous length of belt material in the tool room, or cut from a length of belt material on the shop floor after wrapping the belt 12 around the coupling 10 to determine the correct length.

Once the cut belt 12 is wrapped around the hubs 14, the user slips the retainer 20 over the belt 12. As the retainer 20 is slipped over the belt 12, the retainer 20 deforms the radially outwardly extending pins 46 extending from the belt 12 until the pins 46 are disposed beneath the groove 54. Once the pins 46 are disposed beneath the groove 54, they spring back to their original shape to engage the groove 54 and hold the retainer 20 in place over the belt 12. Alternatively, if rigid pins are provided the flexible belt or a resilient annular retainer can deform to allow the pins to slip beneath the groove.

While there has been shown and described what are at present considered the preferred embodiments of the invention, it will be obvious to those skilled in the art that various changes and modifications can be made therein without departing from the scope of the invention defined by the appended claims.

We claim:

1. A flexible coupling assembly adapted for mounting on the ends of a shaft in coaxial alignment, said coupling comprising:
   a pair of annular hubs, each hub having an outer end, a central bore open to said outer end for receiving an end of a shaft, an inner end facing in an opposite direction of said outer end and facing the inner end of the other hub, said inner end having a circumferential edge in which a plurality of radially outwardly opening receptacles are formed and are spaced around said circumferential edge, and each receptacle is open to the inner end of the hub and substantially aligned with a receptacle formed in the other hub to form a pair of aligned receptacles;
   a molded flexible belt wrapped around said circumferential edge of both hubs, and having a plurality of spaced resilient teeth extending from one side of said belt, and each tooth is received in a pair of said aligned receptacles, wherein said belt is molded with a length greater than the circumference of said circumferential edge, and said belt is cut to a length such that there is no more than one tooth per pair of receptacles;
   an annular retainer slipped over said belt to retain said teeth in said receptacles; and
   at least one pin extending from another side of said belt, wherein said pin is received in a circumferential groove formed on an inner surface of said annular retainer to retain said retainer over said belt.

2. The flexible coupling as in claim 1, in which said belt includes more than one discontinuous belt section.

3. The flexible coupling as in claim 1, in which at least one hub includes an annular portion extending axially from said outer end, and said annular portion has an outer diameter which is less than an outer diameter of said circumferential edge, and the shaft end is received in said bore extending through said annular portion.

4. The flexible coupling as in claim 1, in which said annular retainer is formed from a fiber reinforced polymeric material.

5. The flexible coupling as in claim 1, in which said teeth are formed as an integral part of said belt.

6. The flexible coupling as in claim 1, in which said belt is molded from a material selected from a group consisting of urethane, EPDM, rubber, isoprene, and neoprene.

7. A resilient coupling member for use in a flexible coupling assembly adapted for mounting on the ends of a shaft in coaxial alignment, said coupling including a pair of annular hubs, each hub having an outer end, a central bore open to said outer end for receiving an end of a shall, an axially inner end facing in an opposite direction of said outer end and facing the inner end of the other hub, said inner end having a circumferential edge in which a plurality of radially outwardly opening receptacles are formed and are spaced around said circumferential edge, and each receptacle is open to the inner end of the hub and is substantially aligned with a receptacle formed in the other hub to form a pair of aligned receptacles, said coupling member comprising:
   a molded flexible belt which can be wrapped around the circumferential edge of both hubs, and having a plurality of spaced resilient teeth extending from one side of said belt, and each tooth is received in a pair of said aligned receptacles, wherein said belt is molded with a length greater than the circumference of the circumferential edge, and said belt is cut to a length such that there is no more than one tooth per pair of receptacles; and
   at least one pin extending from another side of said belt, wherein said pin can be received in a circumferential groove formed on an inner surface of a annular retainer to retain the retainer over said belt wrapped around the hubs.

8. The resilient coupling member as in claim 7, in which said belt includes more than one discontinuous belt section.

9. The resilient coupling member as in claim 7, in which said teeth are fanned as an integral part of said belt.

10. The resilient coupling member as in claim 7, in which said belt is molded from a material selected from a group consisting of urethane, EPDM, rubber, isoprene, and neoprene.

11. A flexible coupling assembly adapted for mounting on the ends of a shaft in coaxial alignment, said coupling comprising:
   a pair of annular hubs, each hub having an outer end, a central bore open to said outer end and adapted for receiving an end of a shaft, an inner end facing in an opposite direction of said outer end and facing the inner end of the other hub, said inner end having a circumferential edge including a plurality of radially outwardly opening receptacles spaced around said circumferential edge, and each receptacle is open to the inner end of the hub, and is substantially aligned with a receptacle formed in the other hub to form a pair of aligned receptacles;
   a molded flexible belt wrapped around said circumferential edge of both hubs, and having a plurality of spaced resilient teeth extending from one side of said belt, and each tooth is received in a pair of said aligned receptacles, and at least one pin extending from another side of said belt; and
   an annular retainer slipped over said belt to retain said teeth in said receptacles, said retainer having a circumferential groove formed on a radially inner surface, and said pin is received in said circumferential groove to retain said retainer over said belt.

12. The flexible coupling as in claim 11, in which said belt includes more than one discontinuous belt section.

13. The flexible coupling as in claim 11, in which at least one hub includes an annular portion extending axially from said outer end, and said annular portion has an outer diameter which is less than an outer diameter of said circumferential edge, and the shaft end is received in said bore extending through said annular portion.

14. The flexible coupling as in claim 11, in which said annular ring is formed from a fiber reinforced polymeric material.

15. The flexible coupling as in claim 11, in which said teeth are formed as an integral part of said belt.

16. The flexible coupling as in claim 11, in which said belt is molded from a material selected from a group consisting of urethane, EPDM, rubber, isoprene, and neoprene.

* * * * *

UNITED STATES PATENT AND TRADEMARK OFFICE
CERTIFICATE OF CORRECTION

PATENT NO.     : 6,843,727 B2                                Page 1 of 1
DATED          : January 18, 2005
INVENTOR(S)    : Counter et al.

It is certified that error appears in the above-identified patent and that said Letters Patent is hereby corrected as shown below:

<u>Column 6,</u>
Line 17, "fanned" is changed to -- formed --

Signed and Sealed this

Twenty-fourth Day of May, 2005

JON W. DUDAS
*Director of the United States Patent and Trademark Office*